United States Patent [19]
Carlson

[11] 3,823,635
[45] July 16, 1974

[54] FLAT STOCK CUTTER

[76] Inventor: Richard L. Carlson, 3601 Lemon Tree Ln., Auburn, Wash. 98002

[22] Filed: May 25, 1972

[21] Appl. No.: 256,908

[52] U.S. Cl............. 83/384, 83/389, 83/455, 83/460, 83/487, 83/508, 83/520, 83/522
[51] Int. Cl............................... B26d 5/42
[58] Field of Search ............ 83/508, 388, 389, 455, 83/456, 488, 489, 487, 614, 698, 520, 522, 460

[56] References Cited
UNITED STATES PATENTS

| | | | |
|---|---|---|---|
| 2,727,571 | 12/1955 | Sayles | 83/488 X |
| 2,765,037 | 10/1956 | McDonougn et al. | 83/489 X |
| 3,181,406 | 5/1965 | Sayles | 83/488 X |

Primary Examiner—Andrew R. Juhasz
Assistant Examiner—W. D. Bray
Attorney, Agent, or Firm—Morris A. Case

[57] ABSTRACT

A cutter assembly wherein material to be cut passes underneath a cutter bar, a track extending under the cutter bar holds a slideable carriage, a rotatable cutter wheel mounts to the carriage, resilient means maintains the side of the cutter wheel against the face of the cutter bar, a releasable gripper bar holds the material against the underside of the cutter bar during the cutting cycle, cords attached to the slideable carriage are used to pull the carriage along the track, and means are provided to attach the assembly to a support. A cutter as above mounted in a frame, and having an electric drive motor with controls for moving the carriage is also disclosed.

34 Claims, 14 Drawing Figures

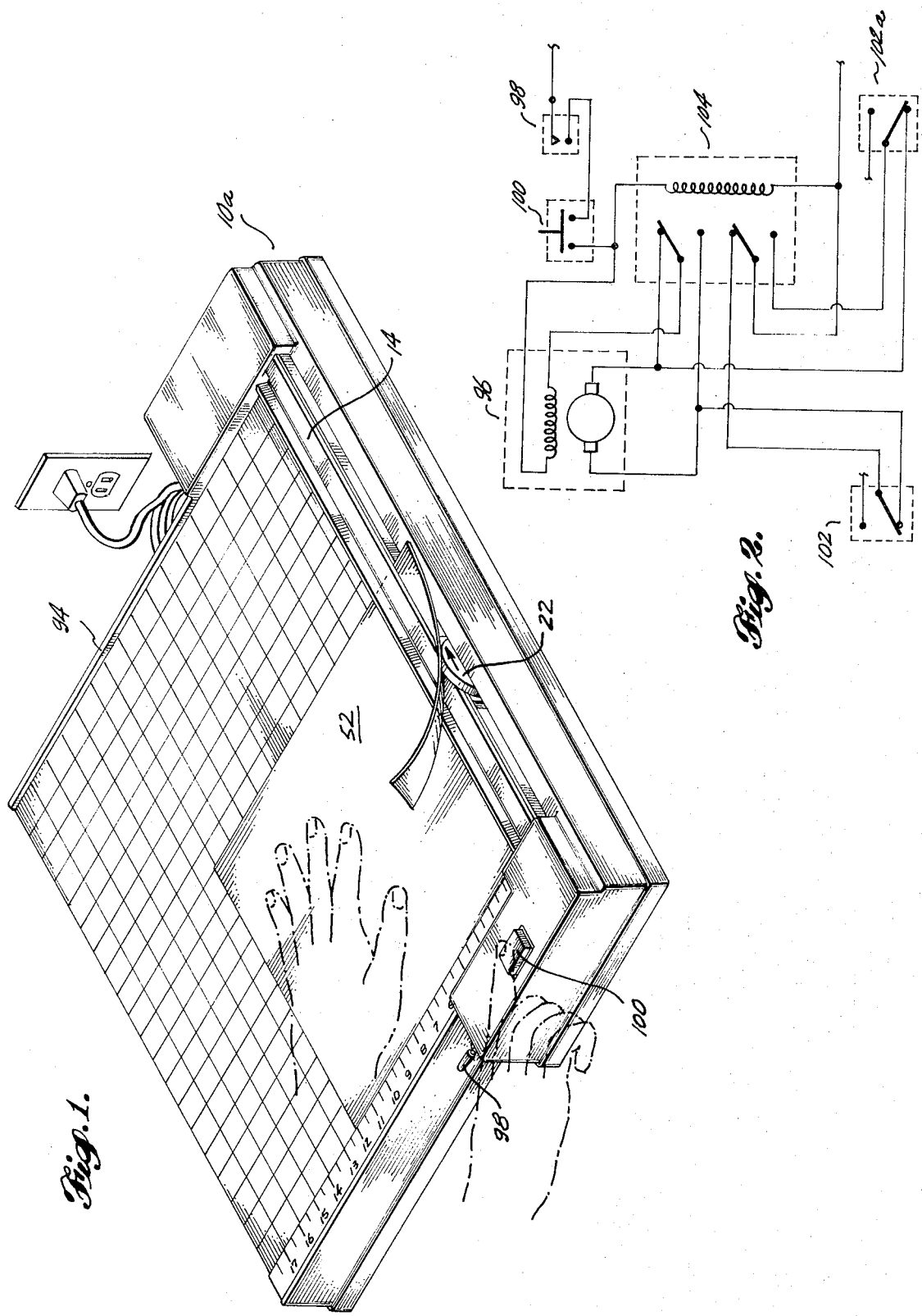

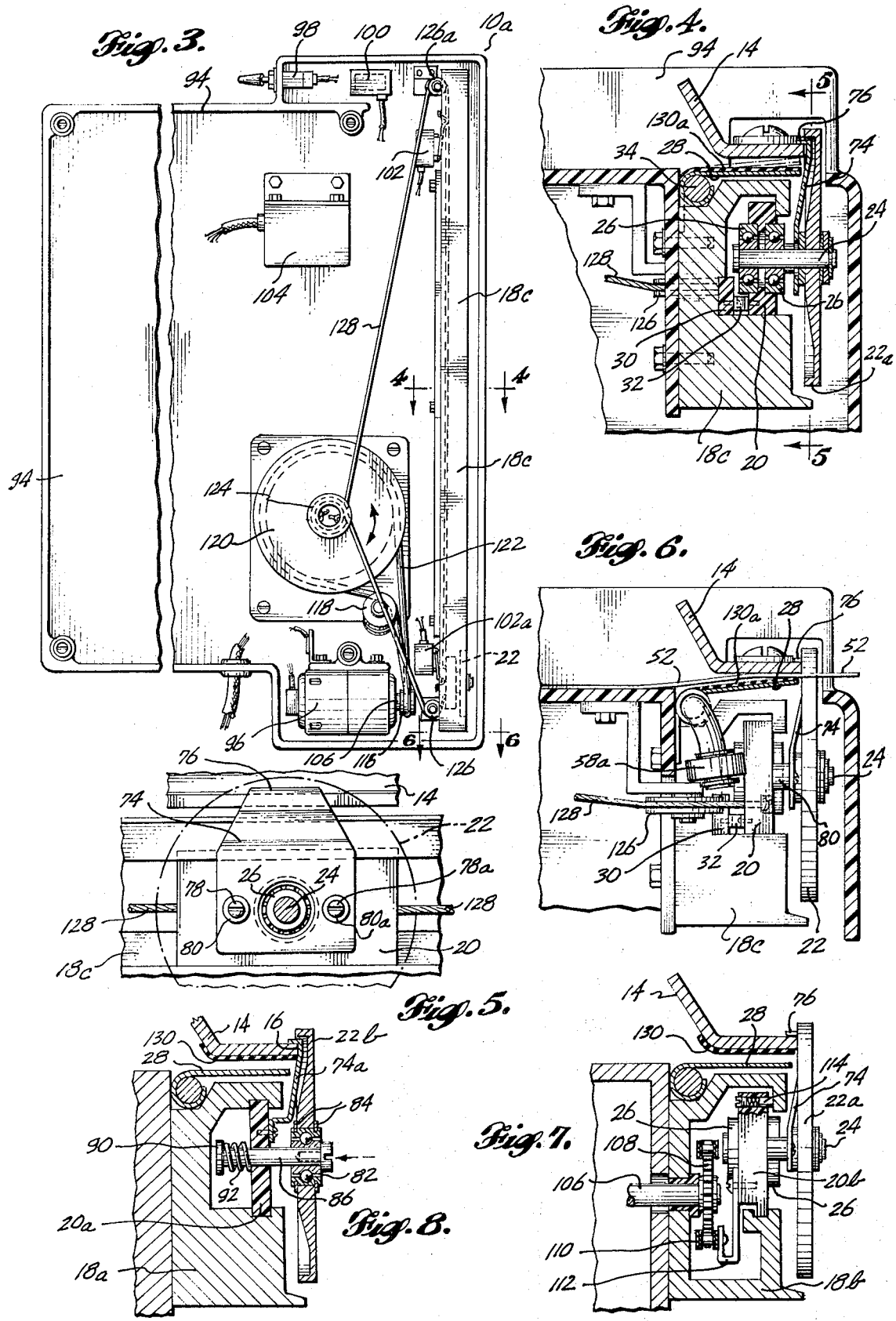

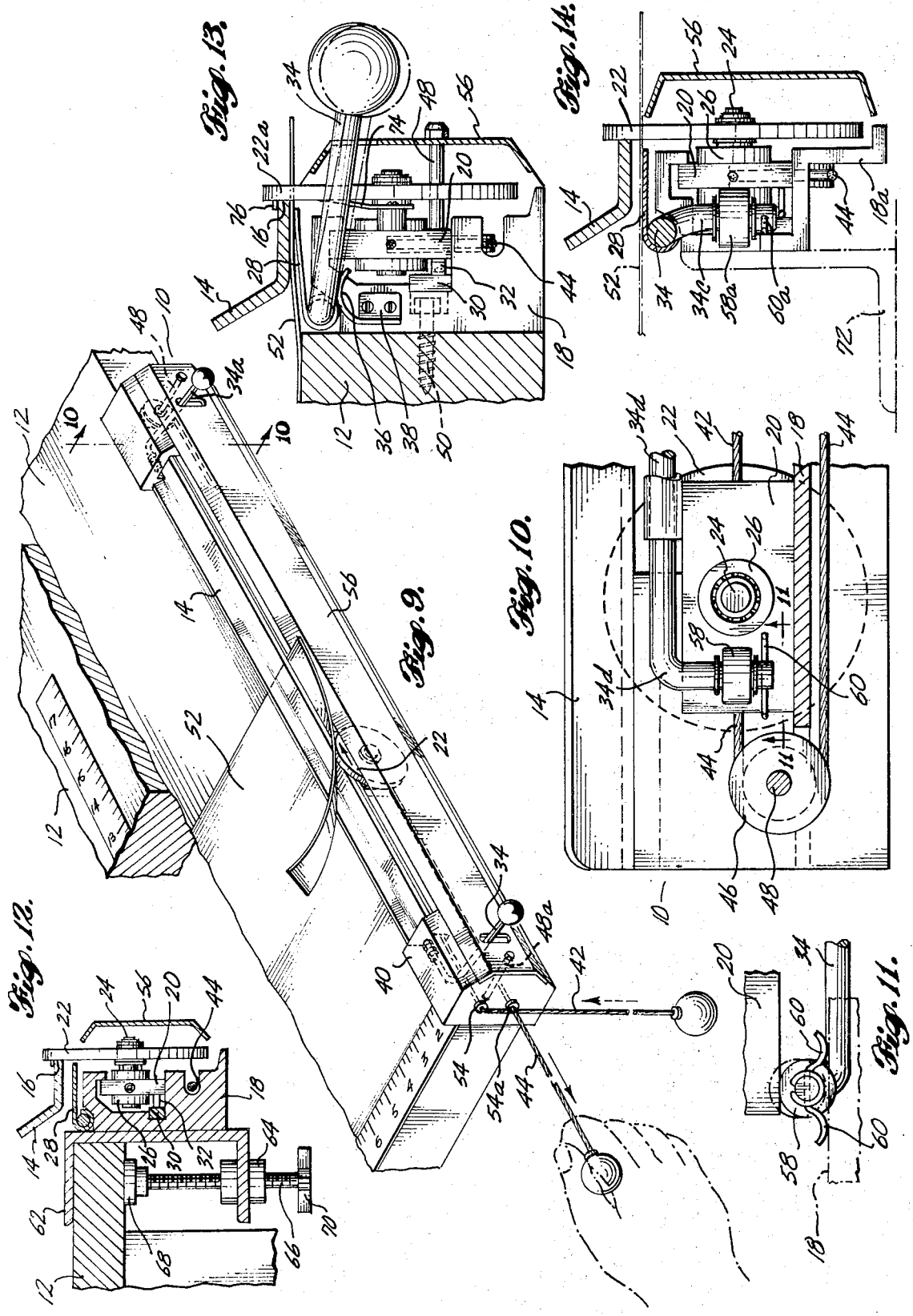

FLAT STOCK CUTTER

BACKGROUND OF THE INVENTION

Cutters of flat stock or sheet material traditionally use a flat surface one edge of which has a cutter bar. The material to be cut is placed on the surface and a sharpened rolling cutter, knife or guillotine is brought along the cutter bar from above to effect the cut. These devices all do a good job, however the material to be cut obscures the line of cut and there is always the possibility of the operator being injured. It was discovered that one could raise the cutter bar, pass the flat stock underneath and accomplish the cut with a cutter wheel which operates against the face of the cutter bar from the bottom up. This gives two distinct advantages. The line of cut is readily observable with the material in position and it is almost impossible for the operator to get cut. The cutter wheel is sharpened along the side of the wheel in contact with the cutter bar but the width of the wheel is not bevelled so that one can place their hand on top of the cutter bar run the wheel to cut material and the hand is pushed away by the cutter with no ill effects.

SUMMARY OF THE INVENTION

A cutter bar is located such that material to be cut passes under the bar allowing an unobstructed view of the line of cut as defined by the face of the cutter bar. A freely rotatable cutter wheel passes along the face of the cutter bar, to effect a cut, with one side of the cutter wheel resiliently held in contact with the face of the cutter bar. The cutter wheel is mounted to a carriage which in turn is slideably mounted in a track located below the cutter bar.

The carriage is pulled back and forth along the track in one embodiment by a pair of cords with one fastened to each end of the carriage. In another embodiment the unit is powered with an electric motor.

A pivotally mounted gripper bar is resiliently urged against the underside of the cutter bar to hold the material in place during the cutting cycle and means are provided to release the gripper bar to allow insertion or removal of material.

An object of this invention is to provide a flat stock material cutter assembly safe to operate.

Another object is to provide a cutter where the line of cut remains visible with the material placed ready to be trimmed.

Another object of this invention is to provide a hand operated cutter assembly that may be quickly mounted to a support.

Still another object of this invention is to provide an integrated cutter for flat stock or sheet material that is completely powered.

Yet another object is to provide a cutter assembly for sheet material where the material is automatically held during the cutting cycle.

DESCRIPTION OF THE DRAWINGS

FIG. 1 is an isometric view of an electric powered cutter.

FIG. 2 is a schematic of the electric circuit used to control the powered cutter.

FIG. 3 is a plan view from the bottom of one embodiment of the system for driving the powered cutter.

FIG. 4 is a sectional view along section 4—4 of FIG. 3.

FIG. 5 is an elevation as seen in section 5—5 of FIG. 4.

FIG. 6 is a sectional view along section 6—6 of FIG. 3.

FIG. 7 is a side elevation showing the relationship of parts of the invention when a chain drive system is being used.

FIG. 8 is a side elevation with parts in section to show a means for resiliently holding the cutter wheel against the face of the cutter bar.

FIG. 9 is an isometric view of a cutter assembly mounted to the edge of a support and illustrating a hand powered cutter.

FIG. 10 is an elevation showing an alternate, automatic means of release for a gripper bar as seen in section 10—10 of FIG. 9.

FIG. 11 is a sectional view taken along section 11—11 of FIG. 10.

FIG. 12 is a side elevation illustrating a quick means of clamping a cutter assembly to a horizontal support.

FIG. 13 is a side elevation illustrating a means of spring loading the gripper bar and also a method of fastening the cutter assembly to a support.

FIG. 14 is a side elevation illustrating an alternate means of fastening the cutter assembly to a support.

DETAILED DESCRIPTION

This invention discloses a hand operated cutter assembly that may be detachably mounted to a support such as but not limited to a table or a wall, and also discloses an integrated unit with a hand operated or motor driven cutter assembly mounted to a frame.

In FIG. 9 a hand operated cutter assembly 10, is shown mounted to a support 12. Many of the essential elements of the cutter assembly are most simply shown in FIG. 12. In FIG. 12 there is cutter bar 14, with face 16, of that bar defining the line of cut, a track 18, mounted is below the cutter bar. A carriage 20, is slideably mounted in the track and cutter wheel 22, is rotatably mounted to the carriage through pin 24, which extends through bearing 26. Pivottally mounted gripper bar 28, shown in the released position, may be rotated to contact the underside of the cutter bar. The carriage is both slideably and pivotally mounted in the track. When sliding the carriage moves parallel with the line of cut and when pivoting moves normal to the line of cut and normal to the direction of the line of the slide. A slideably mounted block 30, slides with the carriage, and spring 32, acting between the sliding block and the carriage pivots the carriage forcing one side of the cutter wheel against the face 16, of the cutter bar.

In FIG. 13 a lever arm 34, fastened to one end of the gripper bar 28, extends to the front of the cutter assembly 10, at approximately right angles from the pivot line of the gripper bar. Another lever arm 34a, is located at the other end of the gripper bar. Leaf spring 36, fastened to the track 18, by clamp 38, pivots the gripper bar to firmly urge that bar against the underside of the cutter bar 14. Either lever arm may be pushed downward to work against the leaf spring to rotate the gripper bar to thereby move it away from the cutter bar. In place of the leaf spring one may use any resilient means such as an elastic rubber material or it may be a coil spring 40, as shown in FIG. 9.

In FIG. 10 a cord 42, is fastened to the carriage 20 at one end of the carriage and a pull on that cord will slide the carriage along the track 18. A second cord 44, is fastened to the other end of the carriage and a pull on the second cord will move the carriage in the opposite direction. Cord 44, is passed over a rotatable pulley 46, which is rotatably mounted on pin 48. This allows cord 44 to reverse direction so the same direction of pull may be applied to either cord. In FIG. 9 a pin 48a, is mounted near the opposite end of the track. This allows one to selectively place pulley 46, on either pin 48 or pin 48a, such that the direction of pull of the cords may both be from either the right hand or the left hand of the assembly 10.

In operation of one preferred embodiment the cutter assembly 10, is attached to support 12, by screw 50, as shown in FIG. 13. Cord 42, is pulled to slideably move carriage 20, to one side of the assembly. Lever arm 34 or 34a is depressed to move gripper bar 28, away from cutter bar 14, and a flat stock material 52, is freely moved to a position under the cutter bar in the cutter. The cutting edge or face 16, is readily observable and defines the line to be cut on the material. When the material is properly positioned the lever arm is released and the gripper bar pivots due to the spring to force and hold the material against the underside of the cutter bar. Cord 44, is pulled to move the carriage 20, with rotatably mounted cutter wheel 22, across the face of the cutter bar to shear the material as shown in FIG. 9. The lever arm is depressed to release the gripper bar and allow free movement of the material. Plastic grommets 54 and 54a, are used to furnish a sliding surface for the cords. Cover 56, is mounted over the face of the assembly.

In another preferred embodiment the gripper bar 28, is released by an alternate means. Lever arm 34c, as shown in FIG. 14 and lever arm 34d, as shown in FIG. 10 are located at opposite ends of the track 18. Note in FIG. 14 an alternate configuration is shown for the track as 18a. Lever arm 34d, has roller 58, mounted thereon, as well as spring 60, best shown in FIG. 11. In operation and when the roller as shown here is against the carriage the gripper bar 28, is held away from contact with the cutter bar 14, and the material 52, to be cut is inserted. As the carriage is moved toward the cutting area it moves out of contact with the roller 58, and spring 60, as well as spring 60a, pushes against the lever arms rotating the gripper bar to hold the material against the cutter bar while the material is being cut. As the carriage reaches the opposite end the carriage pushes against roller 58a, to rotate and thereby move the gripper bar to free the material. The roller is used as a cam when acted against by the carriage. An example of other types of a cam that may be used include but are not limited to a wedge or a ball, but the roller is preferred.

Several embodiments are shown for mounting the cutter assembly 10, to a support 12, in addition to the one shown in FIG. 13. In FIG. 12 the cutter assembly is first fastened to channel 62, by any convenient means such as bolting, or welding. The channel in combination with a threaded eyelet 64, threaded stem 66, with swivel 68, and handle 70, form a C-clamp which may be clamped to support 12. In FIG. 14 the cutter assembly is fastened to an angle iron 72, to allow mounting on a wall, not shown.

In still another embodiment best shown in FIG. 4 an arm 74, is mounted to carriage 20, extending upward and having an offset finger 76, the lower surface of which contacts the upper surface of the cutter bar 14. This arm with finger travels with the carriage to prevent deflection of a long cutter bar. The arm is mounted to the carriage as shown in FIG. 5 with screws 78 and 78a, and spacers 80 and 80a. A modified cutter wheel 22a, has an opening in the side contacting the cutter bar to permit the arm to occupy part of that opening.

In still another preferred embodiment as shown in FIG. 8 a modified track 18a, is slotted to permit a modified carriage 20a, to slide but not to pivot. Modified cutter wheel 22b, is rotatably mounted with bearing 82, and retainer rings 84, to pin 86, which is slideably mounted to the carriage. The pin has a raised portion 90, and a resilient means such as a spring 92, acts between the carriage and the cutter wheel through the pin to resiliently force the edge of the cutter wheel against the face 16, of the cutter bar 14. The cutter wheel 22b, may have an intact width or it may be cut out with an opening as shown in FIG. 8 to accommodate a modified arm 74a. Either of the previously discussed methods of releasing the gripper bar 28, may be used in conjunction with this as well as the other methods shown for supporting the carriage.

In another preferred embodiment, as shown in FIG. 1, a frame provides a surface for material 52, and a support for the cutter assembly 10a and electric motor 96. In FIG. 2 there is shown an on-off switch 98, momentary action switch 100, motor 96, limit switch 102, and 102a, and double pole double throw sequence stepper relay 104, which automatically reverses the motor each time the motor is stopped. In operation switch 98, is energized and momentary switch 100, held down to run the carriage 20, to one side of the cutter 10a. The carriage contacts roller 58, or 58a, which releases gripper bar 28, to allow insertion of material. Switch 100, is again energized and the carriage moves toward the cutting area and away from the roller, springs 60 and 60a, force the gripper bar with the material against the underside of the cutter bar 14, and the material is cut. If the momentary switch is still held down the carriage will go to the end of travel. The limit switch shuts down the motor and the relay reverses the direction on the motor. The carriage again is contacting a roller to pivot the gripper bar and allow free movement of the material into or out of the cutter.

In one motor driven embodiment the drive system as shown in FIG. 7 has motor shaft 106, with sprocket 108, mounted thereon. A continuous chain 110, goes around the sprocket and another similar sprocket, now shown, at the opposite end of the track. An arm 112, attaches to the modified carriage 206, and engages a tooth of the chain. Note in FIG. 7, an alternate track 18b. This carriage is pivoted by a spring and plunger 114, the tip of which may be nylon, teflon or similar low friction wearing material.

In another preferred motor driven embodiment, best shown in FIG. 3, the means for connecting the motor 96, to the carriage 20, has a sheave 116, connected to the shaft 106, of the motor, an idler pulley 118, sheave 120, and a flexible belt 122, encircling the two sheaves and idler pulley. The sheave 120, has a capstan 124, as its hub. A pair of pulley wheels 126 and 126a, and a cord 128, one end of which connects to one end of the carriage thence around pulley 126, thence encircles the capstan thence around pulley 126a, thence connects to the other end of the carriage. This allows an essentially direct line of pull by the cord on the carriage. In operation the sheave 120, is driven by the motor through flexible belt 122, and the cord 128, is powered from the capstan to move the carriage. In an alternate embodiment carriage 20a, with the means shown in FIG. 8 for maintaining the cutter wheel 22, against the face 16, of the cutter bar 14, may be used.

A soft rubber coating 130, may be placed as shown in FIG. 7 on the underside of the cutter bar 14, or a coating 130a, may be placed on the top of the gripper bar 28, to assist in firmly holding the material 52.

Alternate carriage 18c, as shown in FIG. 4 may be used.

While the invention has been described and illustrated with reference to specific embodiments thereof it will be understood that other embodiments may be resorted to without departing from the invention. Therefore, the form of the invention set out above should be considered as illustrative and not as limiting the scope of the following claims.

I claim:

1. A cutter assembly for cutting flat stock materials comprising: a cutter bar located such that material to be cut positions under the cutter bar allowing a view of the exact line to be cut, a track located under the bar, a carriage slideably mounted in the track, a rotatable cutter wheel mounted to the carriage with a side of the wheel in contact with the face of the cutter bar, means for resiliently urging the cutter wheel against the cutter bar, means for moving the carriage such that the mounted cutter wheel moves along the face of the cutter bar to cut the flat stock materials, a pivotable gripper bar firmly urging by resilient means the flat stock material against the underside of the cutter bar to hold the material in place during the cutting cycle, means for releasing the gripper bar to allow freedom of movement of the flat stock material, and means for fastening the cutter assembly to a support.

2. A cutter assembly as in claim 1, wherein the means for moving the carriage comprises: a cord fastened to each of the two ends of the carriage such that pulling on a cord moves the carriage in one direction and pulling on the other cord moves the carriage in the opposite direction, and a rotatable pulley mounted near one end of the track to allow the cord fastened to that end of the carriage to reverse its direction such that the same direction of pull may be applied to either cord.

3. A cutter assembly as in claim 1, wherein the means for resiliently urging the cutter wheel against the cutter bar further comprises: a means of rotatably mounting the cutter wheel to the carriage, and a resilient member acting between the carriage and the cutter wheel.

4. A cutter assembly as in claim 1, wherein the means for resiliently urging the cutter wheel against the cutter bar further comprises: a means for mounting the slideable carriage to allow the carriage to pivot in a direction normal to the direction of slide, and a resilient member acting between the carriage and the track to pivot the carriage with mounted cutter wheel.

5. A cutter assembly as in claim 1, wherein the means for releasing the gripper bar comprises: a lever arm fastened to the end of the gripper bar and extending to the front of the assembly at essentially a right angle to the pivot line of the gripper bar such that movement of the lever arm acts against the resilient means to rotate the gripper bar away from the underside of the cutter bar.

6. A cutter assembly as in claim 1, wherein the means for releasing the gripper bar comprises: a cam mounted on an arm extending from and at essentially a right angle to the pivot line of the gripper bar, with the cam located such that the carriage near the end of its travel strikes the cam to rotate the gripper bar away from the underside of the cutter bar.

7. A cutter assembly as in claim 2, further comprising: a pin mounted near each end of the track to provide the mounting for the rotatable pulley used to change direction of one of the pull cords, to allow one to place the pulley on either pin to select the side from which the cords may be pulled.

8. A cutter assembly as in claim 1, further comprising: a coating of rubber onto the underside of the cutter bar.

9. A cutter assembly as in claim 1, further comprising: a coating of rubber on the top of the gripper bar.

10. A cutter assembly as in claim 1, further comprising: an arm fastened to the carriage extending upward and having an offset finger the lower surface of which contacts the upper surface of the cutter bar, and the cutter wheel having an opening in the side contacting the cutter bar such that the arm occupies part of said opening.

11. A flat stock material cutter allowing direct observation of the exact line of cut comprising: a frame having a surface for holding the material, a cutter bar mounted above the surface to allow insertion of the material under the cutter bar, with the observable face of the cutter bar defining the line of a cut; a track mounted to the frame and located below the surface and extending parallel with the line of cut, a carriage slideably mounted to the track such that the carriage when sliding moves parallel with the line of cut; a rotatable cutter wheel slideably mounted to the carriage; resilient means acting between the carriage and the cutter wheel to force the side of the cutter wheel against the face of the cutter bar, means for sliding the carriage to move the cutter wheel along the face of the cutter bar to cut the flat stock material, a pivotable gripper bar resiliently urging the material against the underside of the cutter bar to hold the material in place during the cutting cycle, and means for releasing the gripper bar to allow free movement of the material.

12. A flat stock material cutter as in claim 11, wherein the means for sliding the carriage comprises: a pair of cords with one of the pair fastened to one end of the carriage and the other cord fastened to the opposite end of the carriage such that a pull on one cord will move the carriage in one direction and a pull on the other cord will move the carriage in the opposite direction; a pulley wheel, rotatable on a mounting pin, over which one of the cords passes to reverse direction of that cord and allows both cords to be pulled from the same direction; and wherein the means for releasing the gripper bar comprises: a lever arm connected to the end of and extending perpendicular to the gripper bar such that movement of the lever arm overcomes the resilience and moves the gripper away from the underside of the cutter bar.

13. A flat stock material cutter as in claim 12, further comprising: an arm fastened to the carriage extending upward had having an offset finger the lower surface of which contacts the upper surface of the cutter bar, and the cutter wheel having an opening in the side contacting the cutter bar such that the arm occupies part of said opening in the cutter wheel.

14. A flat stock material cutter as in claim 13, further comprising: a coating of rubber on the underside of the cutter bar, and a coating of nylon on the surface of the offset finger that contacts the cutter bar.

15. A flat stock material cutter as in claim 11, wherein the means for sliding the carriage comprises: a reversible electric motor, means for connecting the motor to the carriage, means for energizing the motor to move the carriage with cutter wheel, means for stopping and reversing the motor at each end of travel of the carriage, and means for stopping and reversing the motor at intermdiate points of the carriage's travel.

16. A flat stock material cutter as in claim 15, wherein the means of releasing the gripper bar comprises: an arm connected to each end of the gripper bar and extending perpendicular to the gripper bar, a spring fastened to each arm forces contact between the gripper bar and the cutter bar, a cam mounted to each arm is located such that the carriage at each end of travel moves against a cam to compress the spring and move the gripper bar.

17. A flat stock material cutter as in claim 16, wherein the means for connecting the motor to the carriage comprises: a pair of sprockets one mounted on the motor at one end of the track and the other sprocket mounted at the opposite end of the track, a continuous chain extending between and around the sprockets, and an arm attached to the carriage which engages in a tooth of the chain.

18. A flat stock material cutter as in claim 18, wherein the means for connecting the motor to the carriage comprises: a first sheave connected to the shaft of the electric motor; a second sheave; a flexible belt connecting the two sheaves; a capstan integral with the hub of the second sheave; a cord fastened to one end of the carriage encircles the capstan thence fastens to the other end of the carriage; and a pair of pulley wheels over which the cord passes to permit an essentially direct line of pull by the cord on the carriage.

19. A cutter as in claim 18, further comprising a coating of rubber on the lower surface of the cutter bar.

20. A cutter as in claim 18, further comprising: an arm fastened to the carriage extending upward and having an offset finger the lower surface of which contacts the upper surface of the cutter bar, and the cutter wheel having an opening in the side contacting the cutter bar such that the arm occupies part of said opening.

21. A cutter as in claim 20, further comprising: a coating of nylon on the surface of the offset finger that contacts the cutter bar.

22. A cutter for flat stock material allowing direct observation of the exact line of cut comprising: a frame having a surface for holding the material; a cutter bar mounted above the surface to allow insertion of the material under the cutter bar, with the observable face of the cutter bar defining the line of a cut; a track mounted to the frame and located below the surface and extending parallel with the line of cut; a carriage slideably and pivotably mounted to the track such that the carriage when sliding moves parallel with the line of cut and when pivoting moves normal to the line of cut; a cutter wheel rotatably mounted to the carriage; a spring slideably mounted to move with the carriage, the spring action pivots the carriage forcing a side of the cutter wheel against the face of the cutter bar, and means for sliding the carriage on the track to move the cutter wheel along the face of the cutter bar to cut the flat stock material.

23. A cutter for flat stock material as in claim 22, further comprising: a gripper bar pivotally mounted with a resilient member firmly urging the material against the underside of the cutter bar to hold the material during the cutting cycle, and means for releasing the gripper bar to allow free movement of the material.

24. A cutter for flat stock material as in claim 23, wherein the means for sliding the carriage comprises: a pair of cords with one of the pair fastened to one end of the carriage and the other cord fastened to the opposite end of the carriage such that a pull on one cord will move the carriage in one direction and a pull on the other cord will move the carriage in the opposite direction: a pulley wheel, rotatable on a mounting pin, over which one of the cords passes to reverse direction of that cord and allows both cords to be pulled from the same direction; and wherein the means for releasing the gripper bar comprises: a lever arm connected to the end of and extending perpendicular to the gripper bar such that movement of the lever arm overcomes the resilience and moves the gripper bar away from the underside of the cutter bar.

25. A cutter for flat stock as in claim 24, further comprising: an arm fastened to the carriage extending upward and having an offset finger the lower surface of which contacts the upper surface of the cutter bar, and the cutter wheel having an opening in the side contacting the cutter bar such that the arm occupies part of said opening in the cutter wheel.

26. A cutter for flat stock material as in claim 25 further comprising: a coating of rubber on the underside of the cutter bar, and a coating of nylon on the surface of the offset finger that contacts the cutter bar.

27. A cutter for flat stock material as in claim 23, wherein the means for sliding the carriage comprises: a reversible electric motor, means for connecting the motor to the carriage, means for energizing the motor to move the carriage with cutter wheel, means for stopping and reversing the motor at each end of travel of the carriage, and means for stopping and reversing the motor at intermediate points of the carriage's travel.

28. A cutter for flat stock material as in claim 27, wherein the means of releasing the gripper bar comprises: an arm connected to each end of the gripper bar and extending perpendicular to the gripper bar, a spring fastened to each arm forces contact between the gripper bar and the cutter bar and a cam mounted to each arm located such that the carriage at each end of travel moves against a cam to compress the spring and move the gripper bar.

29. A cutter for flat stock material as in claim 28, wherein the means for connecting the motor to the carriage comprises: a pair of sprockets one mounted on the motor at one end of the track and the other sprocket mounted at the opposite end of the track, a continuous chain extending between and around the sprockets, and an arm attached to the carriage which engages in a tooth of the chain.

30. A flat stock cutter assembly as in claim 28, wherein the means for connecting the motor to the carriage comprises: a first sheave connected to the shaft of the electric motor; a second sheave; a flexible belt connecting the two sheaves; a capstan integral with the hub of the second sheave; a cord fastened to one end of the carriage encircles the capstan thence fastens to the other end of the carriage; and a pair of pulley wheels over which the cord passes to permit an essentially direct line of pull by the cord on the carriage 31. A cutter as in claim 30, further comprising a coating of rubber on the lower surface of the cutter bar.

32. A cutter as in claim 30, further comprising: an arm fastened to the carriage extending upward and having an offset finger the lower surface of which contacts the upper surface of the cutter bar, and the cutter wheel having an opening in the side contacting the cutter bar such that the arm occupies part of said opening.

33. A cutter as in claim 32, further comprising: a coating of nylon on the surface of the offset finger that contacts the cutter bar.

34. A cutter assembly for cutting flat stock materials comprising: a cutter bar located such that material to be cut positions under the cutter bar allowing a view of the exact line to be cut; a track located under the bar; a carriage slideably mounted in the track; a freely rotatable cutter wheel mounted to the carriage with a side of the wheel in contact with the face of the cutter bar, said cutter wheel of a width to push away an operator's hand placed against the cutter bar without cutting the operator; means for resiliently urging the cutter wheel against the cutter bar; and means for moving the carriage such that the mounted cutter wheel moves along the face of the cutter bar to cut the flat stock materials.

* * * * *